W. Gee,
Soda Water Apparatus.
No. 1,612. Reissued Feb. 2, 1864
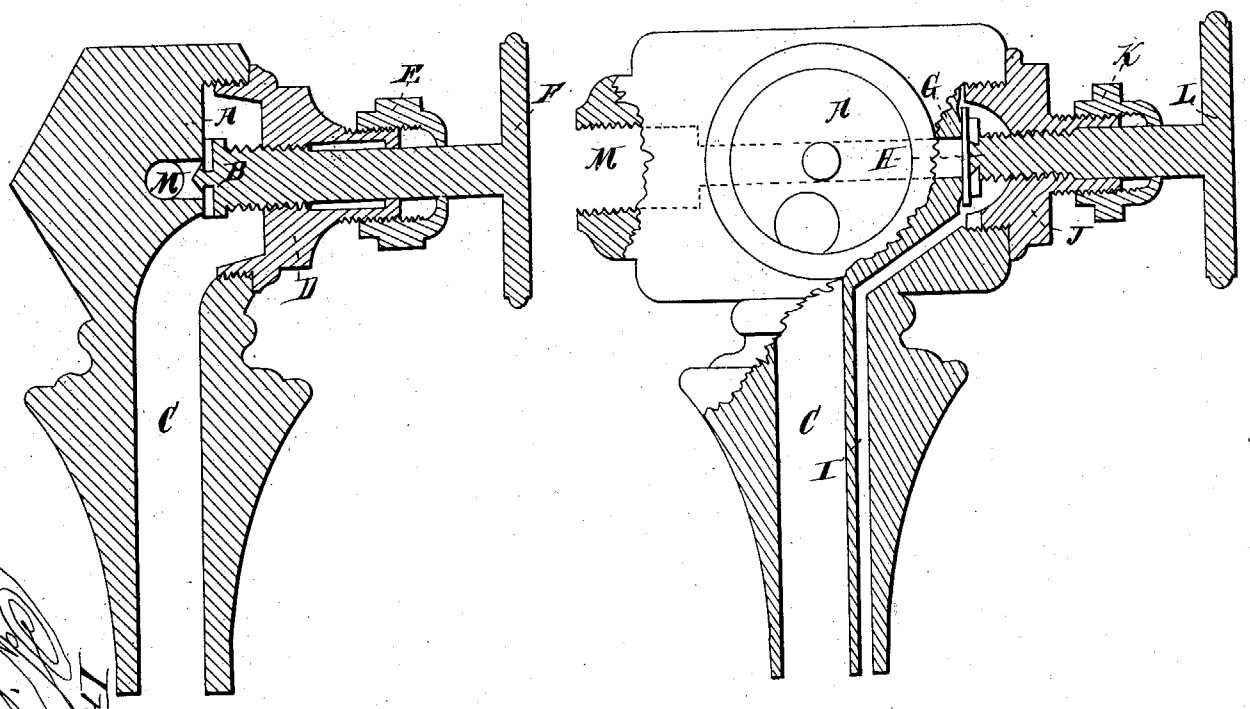
Inventor.
William Gee
N. PETERS, PHOTO-LITHOGRAPHER, WASHINGTON, D. C.

UNITED STATES PATENT OFFICE.

WILLIAM GEE, OF NEW YORK, N. Y.

IMPROVEMENT IN APPARATUS FOR DRAWING SODA-WATER.

Specification forming part of Letters Patent No. 38,577, dated May 19, 1863; Reissue No. 1,612, dated February 2, 1864.

*To all whom it may concern:*

Be it known that I, WILLIAM GEE, of the city of New York, county of New York, State of New York, and a citizen of the United States, have invented a new Apparatus for Drawing Soda-Water; and I do hereby declare that the following is a full and exact description thereof, reference being had to the accompanying drawing, and to the letters of reference marked thereon.

The nature of my invention consists of a double valve for drawing soda-water, so arranged as to have a small hole to draw enough water, and with force to mix well the sirup; then a large hole to fill the glass without the aid of a second glass or vessel, and in about one-half the time done by the old method, and making the soda-water more sparkling.

To enable others to make and use my improved method, I will refer them to the following specification and drawing.

A is the large valve-seat; B, large valve to shut off the water from large opening C; D, head for valve B to screw into; E, cap for making a tight joint around valve spindle B; F, wheel for unscrewing and screwing the valve B; G, small valve-seat; H, small valve to shut off the water from small opening I; J, head for small valve H to screw into; K, cap for making a tight joint around valve-spindle H; L, wheel for screwing and unscrewing the valve H; M, inlet for both valves, this end to be screwed to any tube.

Operation: To draw soda-water, the small valve H is opened to let the water pass through opening I to give the water a sharp stream, and mix well the sirup. Then this valve is closed, and valve B opened to fill the glass or vessel without the aid of a second glass or vessel, which has to be done with the old style or method. The soda-water is drawn into the sirup to mix, and then this (first) glass is put down, and an extra one used to draw plain soda-water, and then poured into the first, or it would be all foam; and in drawing soda-water this way (by the old method) the gas is all out before it comes to the one intended to drink it; and then, drawing soda-water through a small hole or opening, the friction of the water passing out and striking the glass or vessel, it must lose the gas, which causes the water to sparkle if it could be retained. With my method of drawing soda-water, I draw it through the small hole as above mentioned, and then through the large, which passes first through a one-quarter inch hole into a half-inch hole, causing it to flow out with an oil-like stream, and at the same time retaining the gas, making the soda-water more sparkling, much better, and it is drawn in one-half the time, which, with the rest, is one great advantage.

I do not claim valves, heads, caps, and spindles, as they have been made by myself and others.

I claim—

1. A valve, B, and its parts A D E F and opening C, in combination with valve H and its part forming a cock, for the purpose set forth.

2. Drawing soda-water from a small and large opening having one connection with a draft tube on soda-water apparatus.

3. The small opening M, for the purpose of compressing the soda-water while being admitted into the large opening C and outlet, for the purpose set forth.

WILLIAM GEE.

Witnesses:

GEO. SCHIRMER,

JAMES C. WALTER.